US010012519B2

(12) United States Patent
Miyazawa et al.

(10) Patent No.: US 10,012,519 B2
(45) Date of Patent: Jul. 3, 2018

(54) DISPLACEMENT MEASUREMENT DEVICE AND DISPLACEMENT MEASUREMENT METHOD

(71) Applicant: TAIYO YUDEN CO., LTD., Tokyo (JP)

(72) Inventors: Fuyuki Miyazawa, Tokyo (JP); Yasuhito Hagiwara, Tokyo (JP); Takaki Hamamoto, Tokyo (JP); Katsuhiro Oyama, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 106 days.

(21) Appl. No.: 14/989,675

(22) Filed: Jan. 6, 2016

(65) Prior Publication Data

US 2016/0116305 A1   Apr. 28, 2016

Related U.S. Application Data

(63) Continuation of application No. PCT/JP2013/083291, filed on Dec. 12, 2013.

(30) Foreign Application Priority Data

Jul. 22, 2013  (JP) .................................. 2013-151577

(51) Int. Cl.
*G01D 5/26* (2006.01)
*G01D 5/38* (2006.01)
*G01M 11/08* (2006.01)

(52) U.S. Cl.
CPC ............... *G01D 5/266* (2013.01); *G01D 5/38* (2013.01); *G01M 11/08* (2013.01)

(58) Field of Classification Search
CPC ....................................................... G01B 5/38
See application file for complete search history.

(56) References Cited

U.S. PATENT DOCUMENTS 5,652,426 A    7/1997  Maeda
5,754,341 A *  5/1998  Takata ................... G02B 27/46
                                                       216/24
(Continued)

FOREIGN PATENT DOCUMENTS

JP    62-35223 A    2/1987
JP    7-181009 A    7/1995
(Continued)

OTHER PUBLICATIONS

International Search Report (ISR) issued in PCT/JP2013/083291 dated Feb. 2014.
(Continued)

*Primary Examiner* — Shawn Decenzo
(74) *Attorney, Agent, or Firm* — Chen Yoshimura LLP

(57) ABSTRACT

A displacement measurement device includes: a light source; a first diffraction grating and a second diffraction grating arranged along a path of light from the light source and movable relative to one another, the first and second diffraction gratings generating diffracted light; an optical sensor that detects interference light produced by interference between −nth order diffracted light generated as a result of the second diffraction grating diffracting +nth order diffracted light from the first diffraction grating and +nth order diffracted light generated as a result of the second diffraction grating diffracting −nth order diffracted light from the first diffraction grating, where n is a natural number greater than or equal to 1; and a calculation unit calculating, according to a signal from the optical sensor, a relative displacement between the first and second diffraction gratings in a direction orthogonal to an optical axis of the first and second diffraction gratings.

9 Claims, 16 Drawing Sheets

(56) References Cited

U.S. PATENT DOCUMENTS 6,154,278 A 11/2000 Ito et al.
2012/0250031 A1* 10/2012 Ikeda ...................... G01D 5/38
356/499

FOREIGN PATENT DOCUMENTS

| | | |
|---|---|---|
| JP | 7-198424 A | 8/1995 |
| JP | 7-318372 A | 12/1995 |
| JP | 8-334609 A | 12/1996 |
| JP | 10-267694 A | 10/1998 |
| JP | 2001-235349 A | 8/2001 |
| WO | 2011/043354 A1 | 4/2011 |

OTHER PUBLICATIONS

Written Opinion (PCT/ISA/237) issued in PCT/JP2013/083291 dated Feb. 2014. Concise Explanation of Relevance: This Written Opinion considers that the some of claims are not described by or obvious over the reference No. 3 cited in ISR above.).
English translation of Written Opinion (PCT/ISA/237) issued in PCT/JP2013/083291 dated Feb. 2014.

* cited by examiner

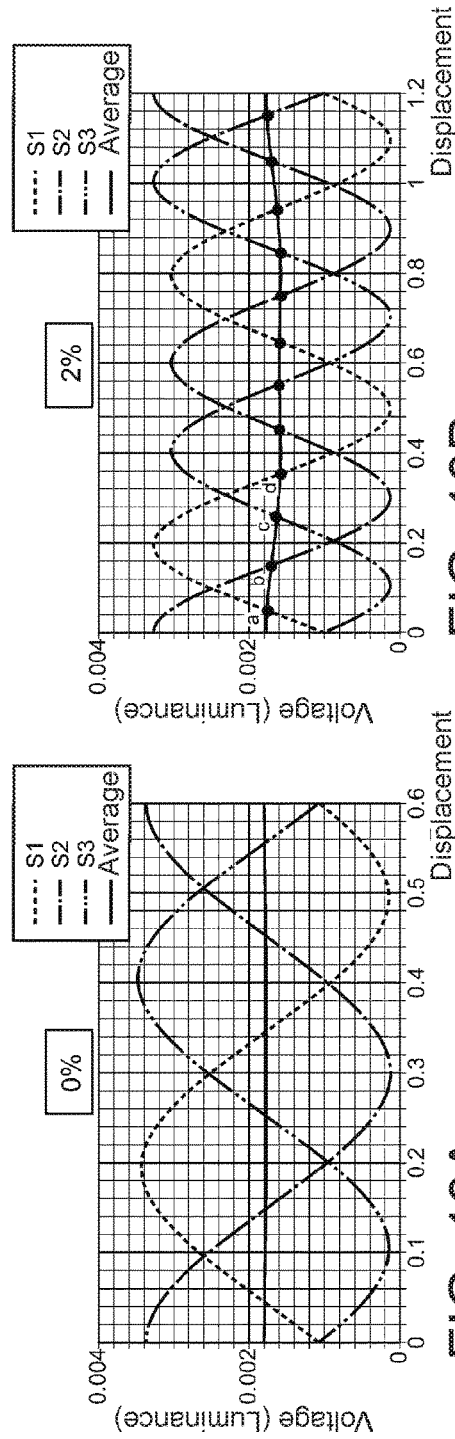
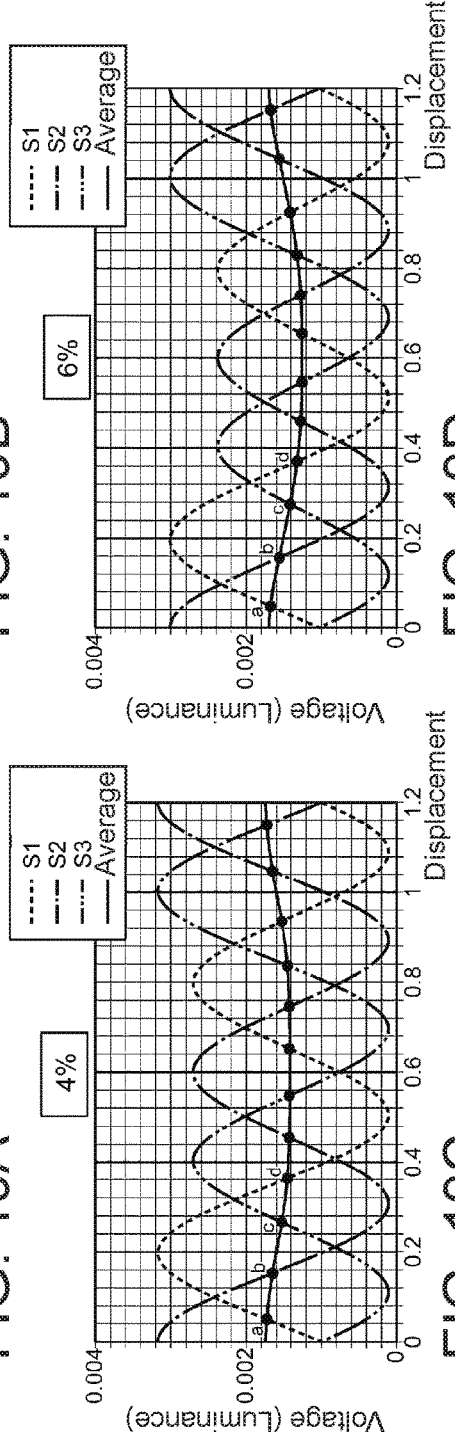
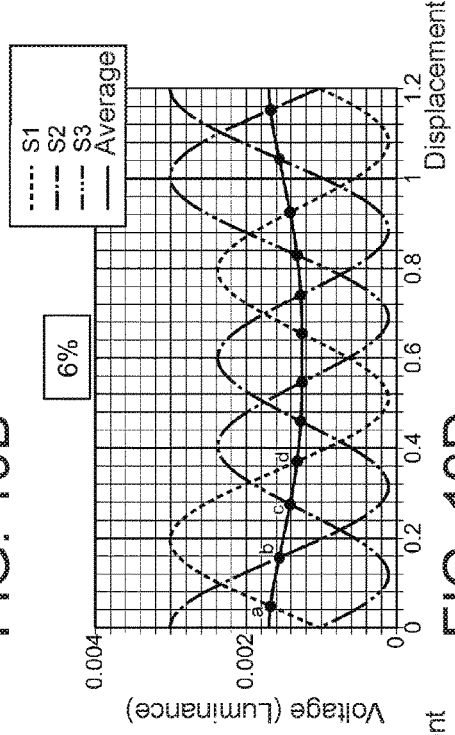
FIG. 19A
FIG. 19B
FIG. 19C
FIG. 19D

DISPLACEMENT MEASUREMENT DEVICE AND DISPLACEMENT MEASUREMENT METHOD

BACKGROUND OF THE INVENTION

Technical Field

The present invention relates to a displacement measurement device and a method of measuring displacement utilizing optical interference.

Background Art

Patent Document 1, for example, discloses a displacement measurement device that utilizes optical interference. This displacement measurement device includes, in order from a light source side, a laser light source, a collimator lens, a first diffraction grating, a second diffraction grating, and an optical sensor. The optical sensor detects interference between diffracted light (first-order diffracted light, for example) diffracted by the first diffraction grating and diffracted light (first-order diffracted light, for example) produced when the second diffraction grating diffracts the zero-order light that passes directly through the first diffraction grating. The displacement measurement device measures changes in the distance between the first and second diffraction gratings (which correspond to the target displacements to be measured) according to changes in the intensity (brightness) of the interference light detected by the optical sensor (see paragraphs [0020], [0023], [0027], and FIGS. 1 to 3 in Patent Document 1, for example).

Patent Document 2 discloses an optical encoder that includes a first slit plate, a second slit plate arranged facing the first slit plate, and a sensor connected to the second slit plate. The pitch of the slits in the second slit plate is less than the pitch of the slits in the first slit plate. The sensor detects light that passes through both the first and second slit plates as the second slit plate is moved relative to the first slit plate and generates pulse signals according to this detected light (see paragraph [0011] and FIG. 3 in Patent Document 2, for example).

RELATED ART DOCUMENTS

Patent Documents

Patent Document 1: WO 2011/043354 Pamphlet
Patent Document 2: Japanese Patent Application Laid-Open Publication No. H7-318372

SUMMARY OF THE INVENTION

As described above, the displacement measurement device described in Patent Document 1 measures the relative displacement between two diffraction gratings in the optical axis direction thereof. In this type of displacement measurement device, as the distance between the diffraction gratings increases, the optical path difference between the two types of light contained in the interference light also increases. Depending on the coherence of the light source, as this optical path difference increases, the amplitude of the interference light may decrease (that is, be attenuated). In other words, as the distance between the diffraction gratings increases, the detection range becomes narrower.

The present invention, in at least one aspect, aims to provide a displacement measurement device and a method of measuring displacement that make it possible to reduce this narrowing of the detection range. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a displacement measurement device, including: a light source; a first diffraction grating and a second diffraction grating that are arranged along a progression path of light from the light source and that are movable relative to one another, the first diffraction grating and the second diffraction grating generating diffracted light; an optical sensor that detects interference light produced by interference between −nth order diffracted light generated as a result of the second diffraction grating diffracting +nth order diffracted light from the first diffraction grating and +nth order diffracted light generated as a result of the second diffraction grating diffracting −nth order diffracted light from the first diffraction grating, where n is a natural number greater than or equal to 1; and a calculation unit that calculates, in accordance with a signal from the optical sensor, a relative displacement between the first diffraction grating and the second diffraction grating in a direction orthogonal to an optical axis of the first diffraction grating and the second diffraction grating.

In another aspect, the present disclosure provides a method of measuring displacement, including: generating diffracted light using a first diffraction grating and a second diffraction grating that are arranged along a progression path of light from a light source and that are movable relative to one another; detecting, using an optical sensor, interference light produced by interference between −nth order diffracted light generated as a result of the second diffraction grating diffracting +nth order diffracted light from the first diffraction grating and +nth order diffracted light generated as a result of the second diffraction grating diffracting −nth order diffracted light from the first diffraction grating, where n is a natural number greater than or equal to 1; and calculating, in accordance with a signal from the optical sensor, a relative displacement between the first diffraction grating and the second diffraction grating in a direction orthogonal to an optical axis of the first diffraction grating and the second diffraction grating.

It is to be understood that both the foregoing general description and the following detailed description are exemplary and explanatory, and are intended to provide further explanation of the invention as claimed.

BRIEF DESCRIPTION OF THE DRAWINGS

FIGS. 19A to 19D are simulations of three waveform signals from the light-receiving regions of a PD for various intensities of zero-order light contained in interference light.

DETAILED DESCRIPTION OF EMBODIMENTS

Figure 1:
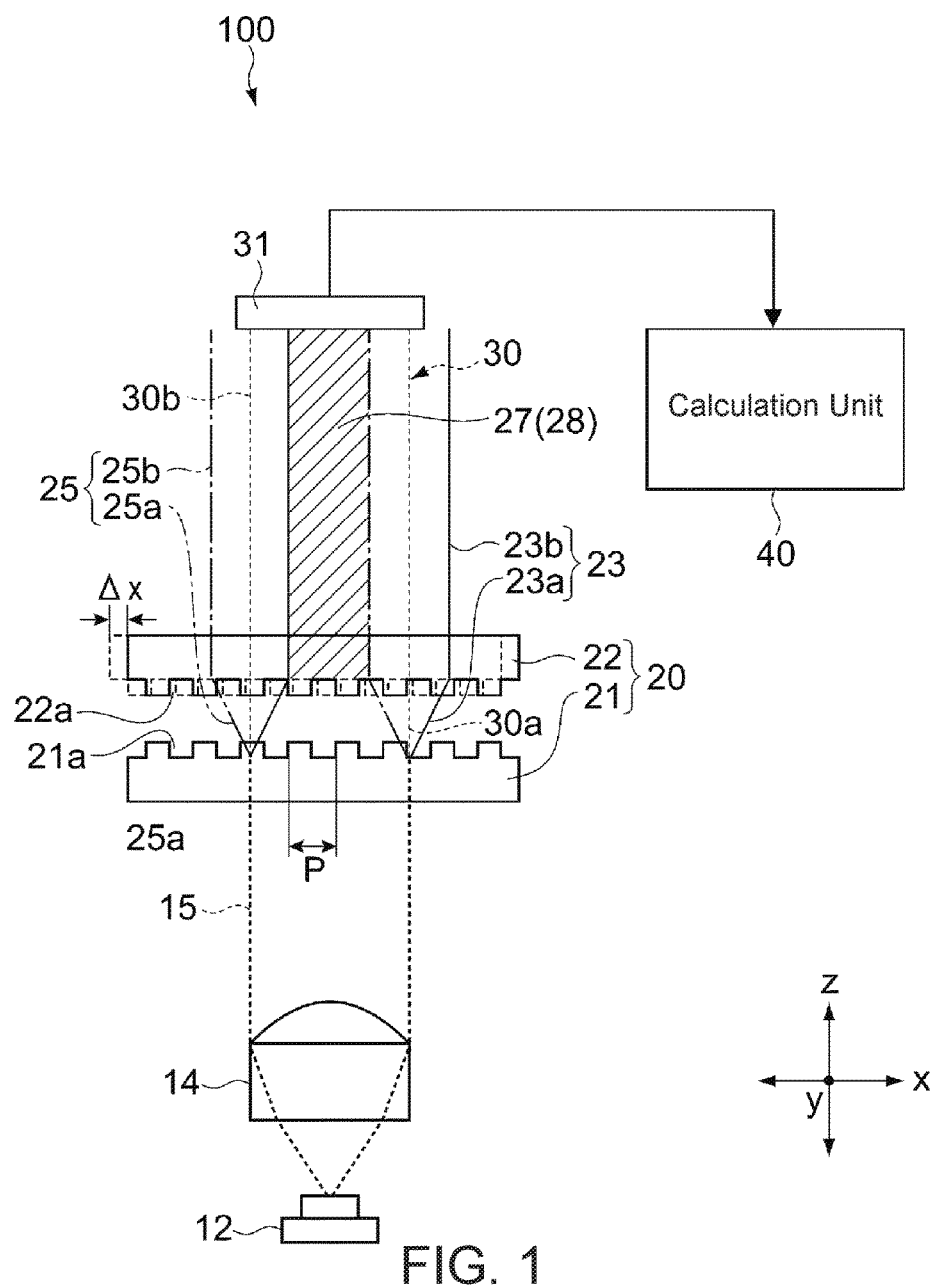
FIG. 1 schematically illustrates a configuration of a basic optical system of a displacement measurement device according to Embodiment 1 of the present invention.

In one aspect, the displacement measurement device according to the present invention as described above does not measure displacement of the pair of diffraction gratings along the optical axis thereof. Rather, the displacement measurement device measures relative displacements of the pair of diffraction gratings in the direction orthogonal to the optical axis. Therefore, by principle, a reduction in the amplitude of the interference light never occurs. This makes it possible to completely solve the problem of the detection range becoming narrower.

Furthermore, there is no optical path difference between the two types of diffracted light in the interference light, and therefore even if the distance between the diffraction gratings were to change, the amplitude of the interference light would not be affected, and it would still be possible to achieve interference light of a suitable amplitude.

The first diffraction grating and the second diffraction grating may each have a plurality of grating lines, and the calculation unit may calculate the displacement in a direction in which the plurality of grating lines are arranged. The intensity of interference light detected by the optical sensor changes according to relative displacements between the first and second diffraction gratings in the direction in which the plurality of grating lines are arranged. This makes it possible for the calculation unit to calculate displacements in that arrangement direction.

The optical sensor may receive zero-order light that travels directly along the optical axis of the first diffraction grating and the second diffraction grating in order to also detect interference light produced by interference between the zero-order light and the ±nth order diffracted light from the second diffraction grating. A distance between the first diffraction grating and the second diffraction grating may be set such that an optical path difference between the ±nth order diffracted light and the zero-order light satisfies $(2m+1)\lambda/4$ (where m is an integer greater than or equal to 0). This ensures that the optical sensor receives interference light of as low an intensity as possible, thereby making it possible to reduce noise due to the zero-order light.

The calculation unit may include a detected value output unit that outputs detected values of a periodic waveform signal from the optical sensor that has a period corresponding to a grating line pitch. The detected value output unit may be configured to have prescribed detection levels such that the calculation unit outputs displacements in units smaller than the grating line pitch. This makes it possible for the calculation unit to output displacements in units smaller than the grating line pitch.

One of the first diffraction grating and the second diffraction grating may be divided into a plurality of shift regions. The plurality of shift regions may have grating line patterns shifted relative to one another in the direction in which the plurality of grating lines are arranged by a prescribed distance that is less than ½ of a grating line pitch. The optical sensor may have a plurality of light-receiving regions that receive light from the plurality of shift regions. This makes it possible to shift the phases of the signals from the light-receiving regions.

The calculation unit may selectively switch between signals from the plurality of light-receiving regions at prescribed times and use a single selected signal for a calculation process. Due to the waveform shape of the signals from the light-receiving regions, the signals have regions in which the detection sensitivity to changes in displacement is reduced. Selectively switching the signals used for the calculation process at prescribed times removes the need to use the signal regions with reduced detection sensitivity in the calculation process, thereby improving measurement precision.

The calculation unit may further include a detected value output unit and a switching unit. The detected value output unit may output detected values of periodic waveform signals from the plurality of light-receiving regions that have periods corresponding to the grating line pitch. The switching unit may switch from a first waveform signal of the waveform signals that is currently being used for the calculation process to a second waveform signal to be used for the calculation process when a prescribed detected value that is less than a peak amplitude of the first waveform signal is detected.

The calculation unit may use detected values at intersections between the first waveform signal and the second waveform signal or detected values at same levels as the detected values at the intersections as the prescribed detected value.

The calculation unit may include a counting unit that counts intersections between periodic waveform signals from the plurality of light-receiving regions that have periods corresponding to the grating line pitch, and the calculation unit may calculate the displacement using a counted value from the counting unit. The number of intersections between the waveform signals increases as the displacement increases, thereby making it possible to measure displacements by counting the intersections.

Alternatively, the calculation unit may include a counting unit that counts intersections of periodic waveform signals from the plurality of light-receiving regions that have periods corresponding to the grating line pitch with an average value of those waveform signals, and the calculation unit may calculate the displacement using a counted value from the counting unit. This makes it possible to reduce noise due to zero-order light even when the optical sensor detects interference light that contains the zero-order light that travels along the optical axis.

The displacement measurement device may further include a first holder that supports the light source and the first diffraction grating, a second holder that supports the second diffraction grating and the optical sensor, and a connecting member that connects together the first holder and the second holder such that the first holder and the second holder are movable relative to one another in the direction orthogonal to the optical axis.

Next, embodiments of the present invention will be described with reference to figures.

1. Embodiment 1

(1) Configuration of Displacement Measurement Device

FIG. 1 schematically illustrates a configuration of a basic optical system of a displacement measurement device according to Embodiment 1 of the present invention.

The displacement measurement device 100 includes a light source 12, a collimator lens 14, a pair of diffraction gratings 20, a photodetector (PD) 31 (an optical sensor), and a calculation circuit 40.

The light source 12 is a laser diode (LD) or a light-emitting diode (LED) and is driven by a driver (not illustrated in the figure).

The collimator lens 14 converts light emitted from the light source 12 into parallel light 15. An optical system for generating parallel light includes at least the light source 12 and the collimator lens 14.

Light from the light source 12 and the collimator lens 14 enters the pair of diffraction gratings 20 and exits as diffracted light. The pair of diffraction gratings 20 includes a first diffraction grating 21 and a second diffraction grating 22 (both of which are transmissive), for example. The first diffraction grating 21 and the second diffraction grating 22 are arranged facing one another along the path of the light beam from the light source 12 and the collimator lens 14 (here, along the optical axis of the light source 12 and the collimator lens 14) and can be moved relative to one another in a prescribed direction.

The first diffraction grating 21 splits the incident parallel light 15 into zero-order light 30a that travels along the optical axis of the pair of diffraction gratings 20, +nth order diffracted light 23a, and −nth order diffracted light 25a (where n is a natural number greater than or equal to 1).

The second diffraction grating 22 transmits the incident zero-order light 30a emitted from the first diffraction grating 21 and emits zero-order light 30b that continues along the optical axis. The second diffraction grating 22 also generates −nth order diffracted light 23b from the incident +nth order diffracted light 23a as well as +nth order diffracted light 25b from the incident −nth order diffracted light 25a.

For convenience, in FIG. 1 diffracted light is illustrated as discrete beams produced from discrete incident light beams. The diffracted beam diffracted to the right side of the incident beam is the positive order diffracted light. The diffracted beam diffracted to the left side of the incident beam is the negative order diffracted light.

The −nth order diffracted light 23b and the +nth order diffracted light 25b interfere with one another, thereby generating interference light 27. The PD 31 is arranged to detect primarily this interference light 27. More specifically, the −nth order diffracted light 23b and the +nth order diffracted light 25b proceed along the optical axis of the pair of diffraction gratings 20 (the Z direction in FIG. 1), and therefore the interference light 27 is produced at a position that includes that optical axis. Therefore, the PD 31 that detects the interference light 27 is arranged on the optical axis of the pair of diffraction gratings 20.

The light that proceeds along the optical axis also includes zero-order light 30. For convenience, this interference light that also includes the zero-order light 30 will be referred to as interference light 28.

In the present embodiment, ±first-order diffracted light is typically used as the ±nth order diffracted light. However, any order of diffracted light such as ±second-order or higher-order diffracted light may be used as long as that diffracted light interferes with one another along the optical axis of the pair of diffraction gratings 20. Moreover, in practice a large number of diffracted beams exist in addition to those illustrated in FIG. 1. However, in order to simplify this description, these additional diffracted beams are not illustrated in the figures.

Below, diffracted light that includes both the +nth order diffracted light 23a and the −nth order diffracted light 23b will be referred to as first diffracted light 23 as necessary. Similarly, diffracted light that includes both the −nth order diffracted light 25a and the +nth order diffracted light 25b will be referred to as second diffracted light 25 as necessary. Furthermore, zero-order light that includes both the zero-order light 30a and the zero-order light 30b will be referred to as zero-order light 30.

The first diffraction grating 21 and the second diffraction grating 22 have substantially the same size and shape. For example, the diffraction grating 21 (or 22) includes a plurality of grating lines 21a (or 22a), which are grooves that run in the Y direction (which is orthogonal to the Z direction in FIG. 1). The pitch P of the grating lines 21a of the first diffraction grating 21 is substantially equal to the pitch P of the grating lines 22a of the second diffraction grating 22. The grating lines 21a and 22a are grooves with a pitch P of 3.3 µm and a depth of 473 µm, for example. The dimensions of the grating lines are not limited to these values.

The displacement measurement device 100 according to the present embodiment measures the relative displacement Δx of the pair of diffraction gratings 20 in the X direction, which is the direction in which the grating lines 21a and 22a are arranged side by side. The measurable range includes sub-micrometer displacements to displacements on the micrometer order, for example.

In the present specification, the two axes orthogonal to the Z direction are the X and Y axes. As described above, the direction in which the grating lines 21a and 22a of the diffraction gratings run is the Y direction, and the direction in which the grating lines 21a and 22a are arranged side by side is the X direction.

As described later, at least the second diffraction grating 22 and the PD 31 are integrally fixed to one another and can move as a single unit relative to the first diffraction grating 21 in the X direction.

The calculation circuit 40 (which functions primarily as a calculation unit) implements a prescribed calculation process according to signals from the PD 31 in order to calculate the displacement Δx. The calculation circuit 40 includes hardware such as a microprocessor (MPU), a random-access memory (RAM), and a read-only memory (ROM), for example. In addition to or instead of the MPU, the calculation circuit 40 may include a programmable logic device (PLD) such as a field-programmable gate array (FPGA) or may include a digital signal processor (DSP), an application-specific integrated circuit (ASIC), or the like. Furthermore, the calculation circuit 40 may include a plurality of physically separated chip packages or devices or the like.

(2) Measurement Principle of Displacement Measurement Device

Figure 2:
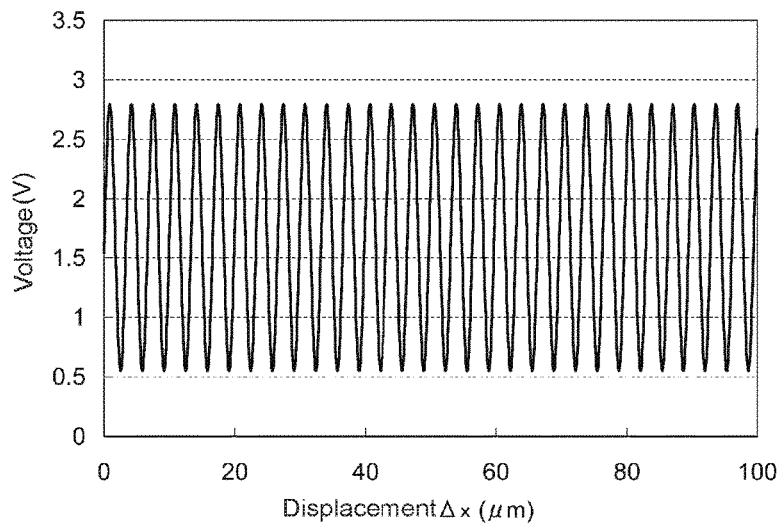
FIG. 2 is a graph showing the relationship between relative displacements of a pair of diffraction gratings in the X direction and the resulting voltage signals produced by a PD.

FIG. 2 is a graph showing the relationship between relative displacements (in μm) of the pair of diffraction gratings 20 in the X direction and the resulting voltage signals produced by the PD 31. In this example, the pitch of the grating lines 21a and 22a of the pair of diffraction gratings 20 is 3.3 μm, and the center wavelength of the light from the light source 12 is 850 nm.

As shown in the graph, the PD 31 outputs a periodic waveform signal, with the period corresponding to the pitch P of the grating lines 21a and 22a. In other words, the PD 31 detects the light intensity, with each set of bright and dark areas caused by the grating lines of pitch P being one period of the signal. This periodic waveform signal is typically a sine wave signal.

Figure 3:
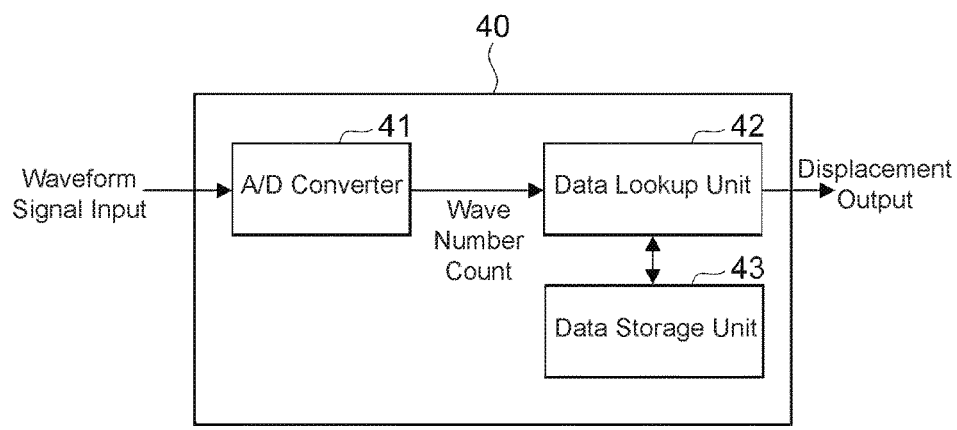
FIG. 3 is a block diagram illustrating a functional configuration of a calculation circuit.

FIG. 3 is a block diagram illustrating the functional configuration of the calculation circuit 40. The calculation circuit 40 mainly includes an A/D converter 41, a data lookup unit 42, and a data storage unit 43.

The A/D converter 41 functions as a detected value output unit that converts the analog signal from the PD 31 to digital values and then outputs those digital values. The A/D converter 41 also counts the frequency of the waveform signal by counting the number of waves in the input signal and outputs this counted value, for example.

The data storage unit 43 stores a lookup table that defines the correspondence between the number of waves (the counted value) in the waveform signal detected by the PD 31 when the pair of diffraction gratings 20 undergo relative movement and the associated relative displacement of the pair of diffraction gratings 20. This lookup table is stored in the memory when the displacement measurement device 100 is manufactured.

The data lookup unit 42 extracts the displacement corresponding to the number of waves counted by the A/D converter 41 from the data storage unit 43 and outputs this displacement value. In other words, the calculation circuit 40 can measure displacements in units of the pitch of the grating lines 21a and 22a of the diffraction gratings.

When the pair of diffraction gratings 20 are in a relative position that corresponds to an initial position such as a reference position, the output signal from the PD 31 takes a value of 0. Moreover, the shape and arrangement of the pair of diffraction gratings 20 and the PD 31 as well as the circuits and programs used for the calculation circuit 40 are designed such that the relative displacement of the pair of diffraction gratings 20 is zeroed at this initial position.

The calculation circuit 40 may also have a feature for resetting the displacement to 0 when the pair of diffraction gratings 20 are in the reference position. This is effective as a correction method for if, due to changes in the displacement measurement device 100 over time for example, the calculation circuit 40 no longer outputs a displacement value of 0 when the pair of diffraction gratings 20 are in the reference position. In this case, the calculation circuit 40 may also have a feature for updating the lookup table stored in the data storage unit 43 using the correction data.

Figure 4:
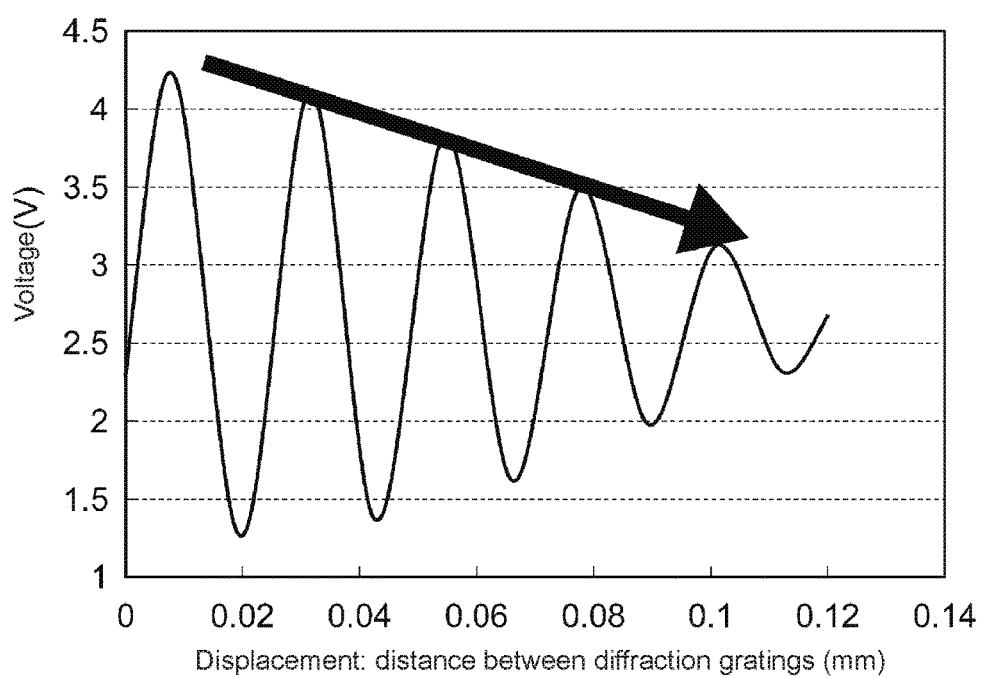
FIG. 4 is a graph showing an example of a reduction in the amplitude of interference light as the distance between the diffraction gratings is increased in the optical system disclosed in Patent Document 1.

As described above, the displacement measurement device 100 does not measure displacement of the pair of diffraction gratings 20 along the optical axis thereof. Rather, the displacement measurement device 100 measures relative displacements of the pair of diffraction gratings 20 in the direction orthogonal to the optical axis. Due to the use of this measurement principle, a decrease in the amplitude of the interference light that manifests as the distance between the diffraction gratings 21 and 22 increases (as shown in the graph in FIG. 4, in which the horizontal axis is the distance in the Z direction between the diffraction gratings) does not occur. This makes it possible to completely solve problems such as the narrowing of the detection range.

Furthermore, in the present embodiment, the path lengths (optical path lengths) of the first diffracted light 23 and the second diffracted light 25 are substantially equal. In other words, there is no optical path difference. Therefore, even if the distance between the diffraction gratings 21 and 22 were to change, the amplitude of the interference light would not be affected, and it would still be possible to achieve interference light of a suitable amplitude.

(3) Effects of Changes in Distance Between Diffraction Gratings

Figure 5A:
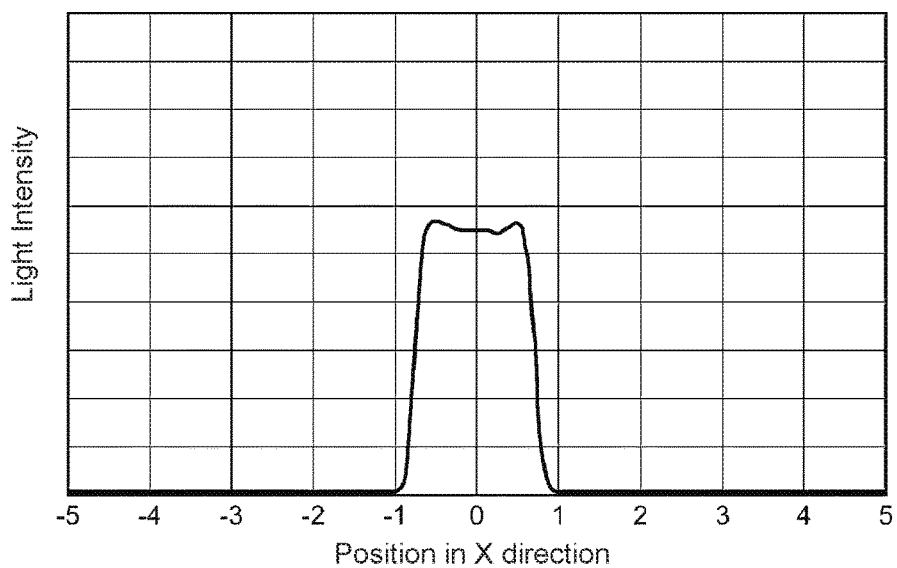
FIGS. 5A and 5B are graphs showing the strength distributions of signals from a PD when the distance between the diffraction gratings is intentionally changed.
Figure 5B:
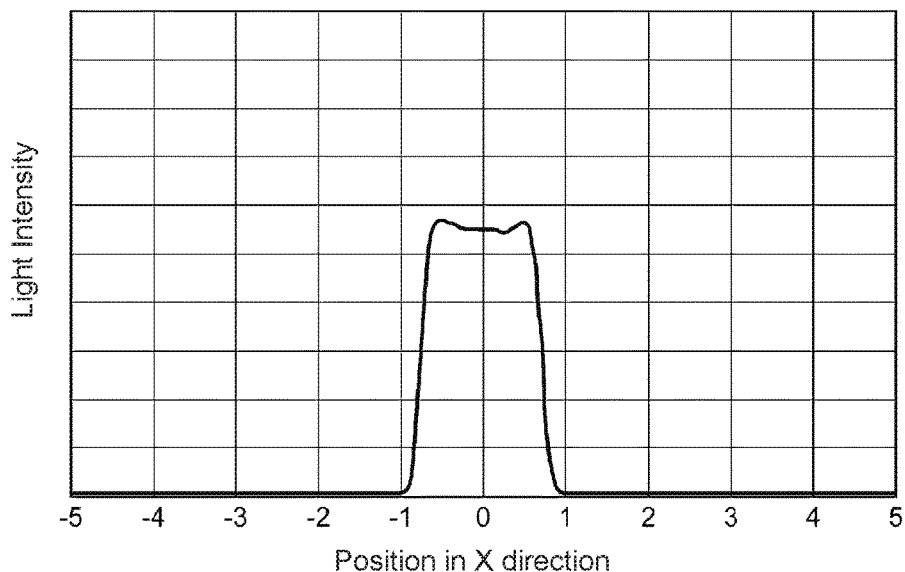

The inventors intentionally changed the distance (the distance in the Z direction) between the diffraction gratings 21 and 22 and measured the resulting changes in the signals from the PD 31. FIG. 5A is a graph of the strength distribution of the signal from the PD 31 when the distance between the diffraction gratings 21 and 22 was 15 μm, and FIG. 5B is a graph of the same when the distance between the diffraction gratings 21 and 22 was 23 μm. In other words, the vertical axis represents light intensity (as measured using the output from the optical sensor), and the horizontal axis represents position (in mm) in the X direction (as illustrated in FIG. 1), where the position through which the optical axis passes is 0 mm.

Figure 6A:
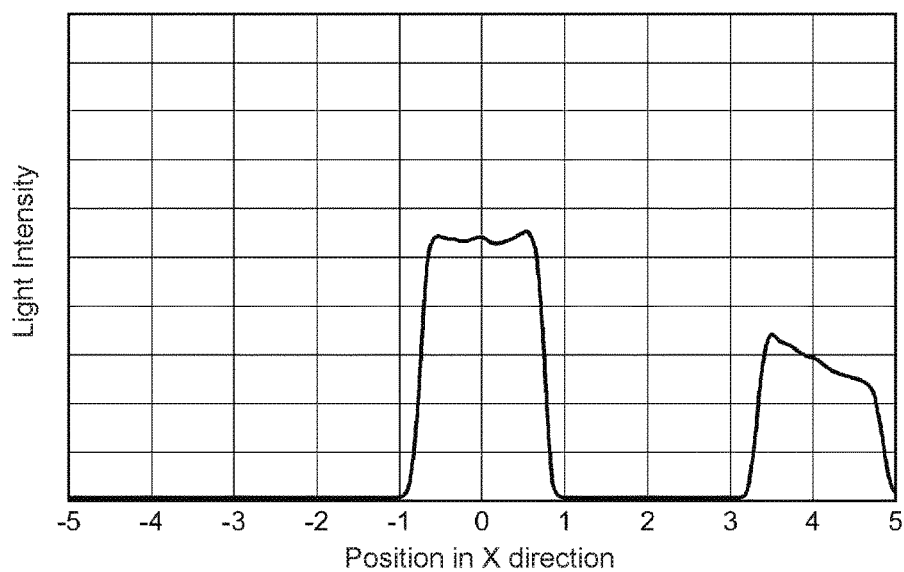
FIGS. 6A and 6B are graphs showing the strength distributions of signals from two PDs when an additional PD that detects another type of interference light and is arranged at a position shifted away from the optical axis of a pair of diffraction gratings is added to the displacement measurement device according to Embodiment 1.
Figure 6B:
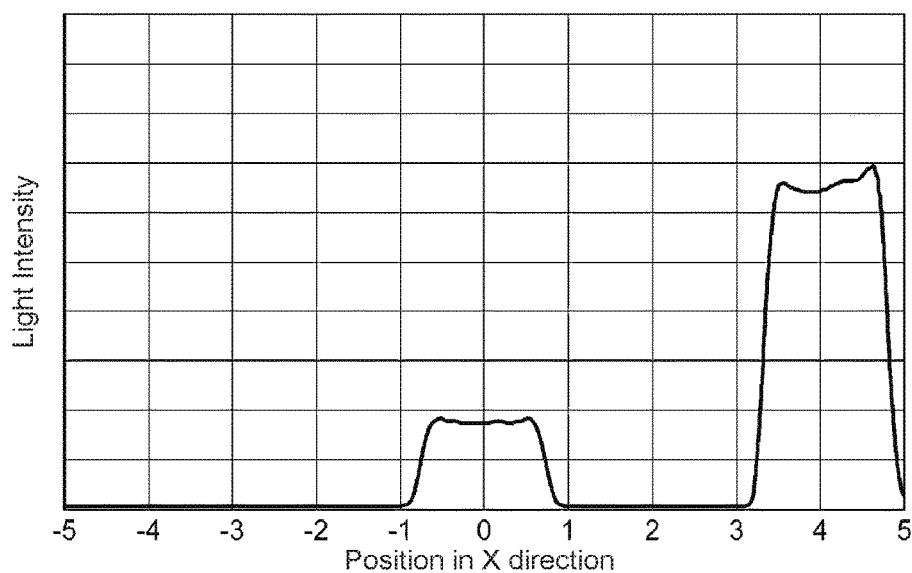

Meanwhile, FIGS. 6A and 6B are graphs of the strength distributions of a signal of a second PD that is arranged at a position shifted away from the optical axis of the pair of diffraction gratings 20 and detects another type of interference light (the strength distributions to the right of center in the graphs) as well as the strength distributions of the signal of an optical axis PD arranged on the optical axis (the center strength distributions in the graphs).

Here, "another type of interference light" refers to the interference light produced by interference between +1st order diffracted light produced when the second diffraction grating diffracts zero-order light from the first diffraction grating and zero-order light produced when the second diffraction grating diffracts +1st order diffracted light from the first diffraction grating (see FIG. 1 in Patent Document 1). Specifically, the light-receiving region of the second PD is arranged at a position roughly spanning 3-5 mm.

As shown in these graphs, when the distance between the diffraction gratings changes, the intensity of light along the optical axis as detected by the optical axis PD also changes. This is because when the distance between the diffraction gratings changes, the interference conditions (here, the optical path difference) also change.

In contrast, as shown in FIGS. 5A and 5B, the light intensity exhibits no substantial change even when the distance between the diffraction gratings 21 and 22 is changed. In other words, as described above, because there is no optical path difference between the first diffracted light 23 and the second diffracted light 25, interference light of a stable intensity can be obtained even when the distance between the diffraction gratings 21 and 22 changes.

(4) Setting Distance Between Diffraction Gratings

As illustrated in FIG. 1, in addition to the interference light 27, the PD 31 also receives the zero-order light 30 that travels along the optical axis of the pair of diffraction gratings 20. In other words, the PD 31 actually receives interference light 28 (see FIG. 1), which includes the first diffracted light 23, the second diffracted light 25, and the zero-order light 30. However, this zero-order light 30 is typically not needed for measurement of displacements Δx, and therefore this zero-order light appears in the output signal from the PD 31 as noise.

Therefore, in the displacement measurement device 100, the distance in the Z direction between the diffraction gratings 21 and 22 is set to a prescribed value in order to reduce noise due to the zero-order light 30. This distance is set such that the optical path differences between the three types of light in the interference light 28 (that is, the zero-order light, the first diffracted light 23, and the second diffracted light 25) satisfy the formula $(2m+1)\lambda/4$ (where m is an integer greater than or equal to 0). As described above, there is no substantial optical path difference between the first diffracted light 23 and the second diffracted light 25, and therefore only the optical path difference between the zero-order light and the first diffracted light 23 (or the second diffracted light 25) must satisfy the formula above.

In other words, the first diffraction grating 21 and the second diffraction grating 22 are arranged such that the optical path differences follow the pattern $0.25\lambda$, $0.75\lambda$, $1.25\lambda$, and so on. Setting the distance between the diffraction gratings 21 and 22 in this way ensures that the PD 31 receives interference light 28 of as low an intensity as possible, thereby reducing noise due to the zero-order light.

FIGS. 7A to 7D are graphs showing simulations of the signal from the PD 31 for optical path differences of $0.25\lambda$, $0.5\lambda$, $0.75\lambda$, and $\lambda$. Note that in these graphs, the dotted waveforms represent the other type of interference light produced when the pair of diffraction gratings undergo relative displacement and detected by a PD that is shifted away from the optical axis (like the second PD in the description above). As described above, this other type of interference light is the interference light produced by interference between +1st order diffracted light produced when the second diffraction grating diffracts zero-order light from the first diffraction grating and zero-order light produced when the second diffraction grating diffracts +1st order diffracted light from the first diffraction grating (see FIG. 1 in Patent Document 1).

Figure 7A:
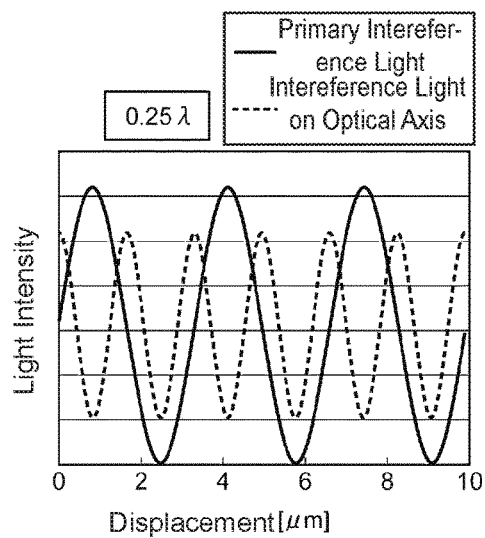
FIGS. 7A to 7D are simulations of the signals from the PDs for various optical path differences between the types of light contained in the interference light that travels along the optical axis of the pair of diffraction gratings.
Figure 7C:
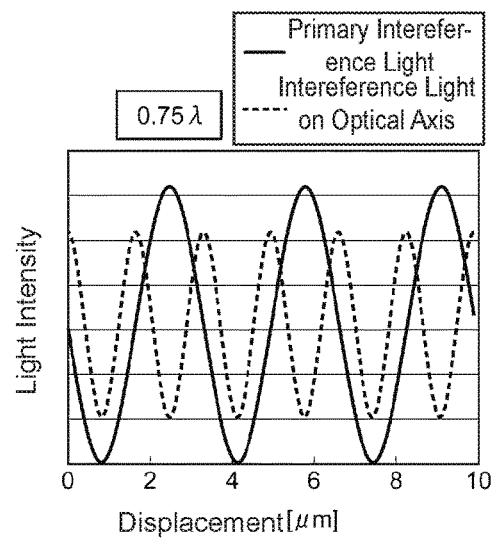
Figure 7B:
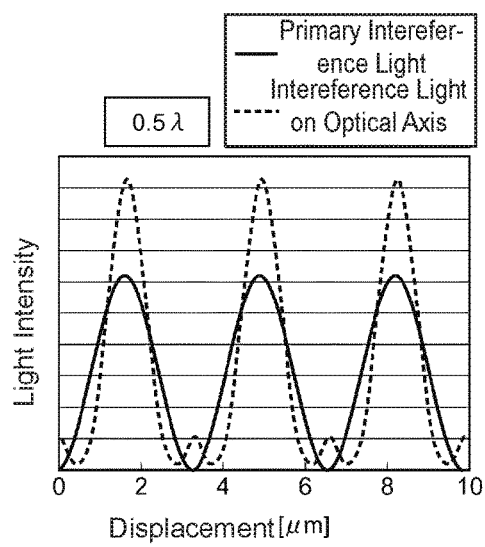
Figure 7D:
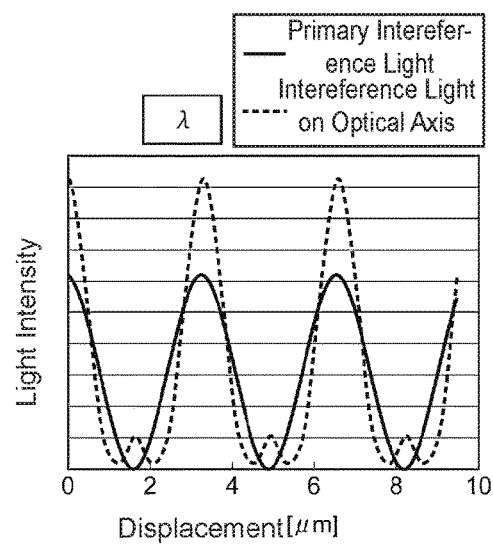

As shown in FIGS. 7A and 7C, the PD 31 can still produce a periodic waveform signal of a suitable shape when the optical path differences between the three types of light occur at $0.25\lambda$ and $0.75\lambda$. Meanwhile, as shown in FIGS. 7B and 7D, when the optical path differences occur at $0.5\lambda$ and $\lambda$, the resulting signal still represents high intensity light but contains much more noise due to the zero-order light.

(5) Alternative Counting Process for Counting Unit

In Embodiment 1, the A/D converter 41 counts the number of waves in the waveform signal. However, the count may also be performed and output in units of half-wavelengths by detecting the upper and lower peaks in the waveform signal. This makes it possible for the displacement measurement device to measure displacements with a resolution of half of the grating line pitch (that is, with a resolution of 1.65 µm when the grating line pitch is 3.3 µm, for example).

2. Embodiment 2

Next, a displacement measurement device according to Embodiment 2 of the present invention will be described.

The following description abbreviates or omits entirely descriptions of components and features that are the same as in the displacement measurement device 100 according to Embodiment 1 and illustrated in FIG. 1 and the like and focuses instead on the aspects that are different. Moreover, in all of the following embodiments, the principle of generating interference light by using a pair of diffraction gratings is the same as in Embodiment 1.

The hardware used in the overall configuration of the displacement measurement device according to Embodiment 2 is typically the same as in the displacement measurement device 100 illustrated in FIG. 1.

Figure 8:
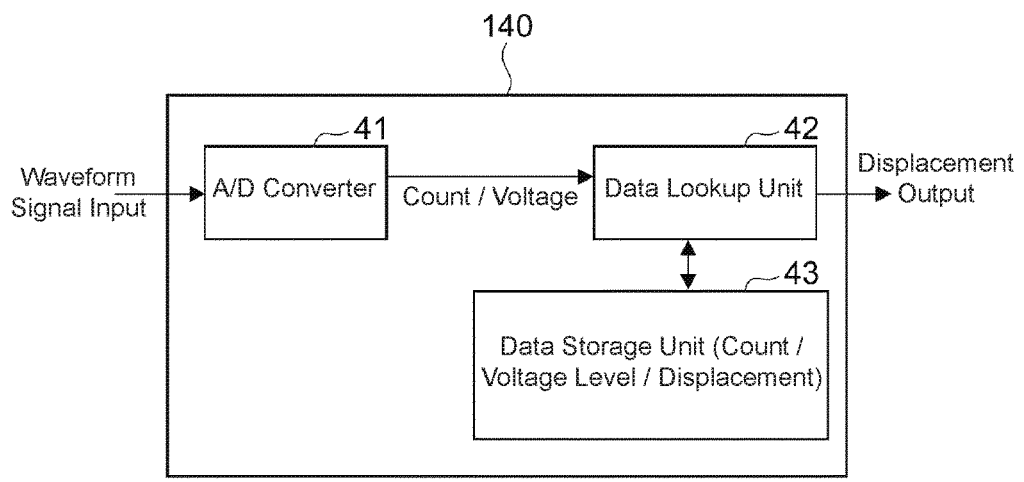
FIG. 8 is a block diagram illustrating a functional configuration of a calculation circuit according to Embodiment 2.

FIG. 8 is a block diagram illustrating the functional configuration of a calculation circuit according to Embodiment 2.

Figure 9:
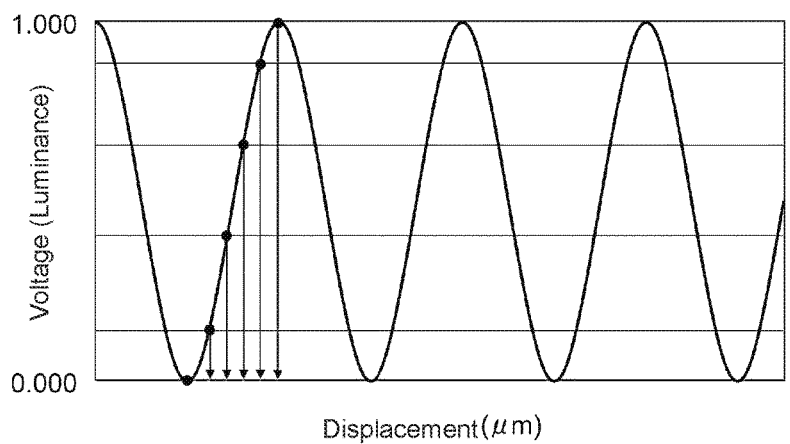
FIG. 9 is a graph showing the relationship between relative displacements of a pair of diffraction gratings in the X direction and the resulting voltage signals produced by a PD.

FIG. 9 is a graph showing the relationship between relative displacements (in µm) of a pair of diffraction gratings 20 in the X direction and the resulting voltage signals produced by a PD 31 using a smaller scale for the horizontal axis than in the graph in FIG. 2. In the graph in FIG. 9, the amplitude of the voltage waveform signal is normalized to 1 such that the brightness (intensity) of the interference light received by the PD 31 takes a maximum value of 1 on the vertical axis.

A calculation circuit 140 according to the present embodiment divides the amplitude plotted on the vertical axis of the graph into a prescribed number of discrete voltage levels (detection levels) and monitors the waveform signal on those voltage levels. In other words, an A/D converter 41 is configured to detect a prescribed number of voltage levels so that the calculation circuit 140 can output displacements in units finer than the grating line pitch.

A data storage unit 43 stores data that defines the correspondence between the voltage levels and the number of waves counted and the displacements associated with those voltage levels and counted values. The waveform signal is not linear but rather a sine wave, and therefore non-uniformly spaced voltage values are selected and stored so that the spacing between the stored displacement values is uniform, for example.

Furthermore, in the present embodiment, two equal voltages occur in each period of the signal, and therefore the A/D converter 41 counts and outputs the counted number of waves in units of half-wavelengths (that is, at twice the frequency of the source waveform). In this case, the A/D converter 41 can count the upper and lower peaks in the waveform signal in order to count the number of waves in units of half-wavelengths. Moreover, the A/D converter 41 outputs the currently measured voltage in units of the discrete voltage levels described above.

A data lookup unit 42 gets the counted value and voltage output from the A/D converter 41. The data lookup unit 42 then extracts the displacement corresponding to that counted value and voltage from the data storage unit 43 and outputs this displacement value. In this way, the calculation circuit 140 can measure displacements in units smaller than the pitch of grating lines 21$a$ and 22$a$ of the diffraction gratings (in units with a precision of 100 nm, for example).

Moreover, as described below in Embodiment 3, equally spaced voltage levels may be stored in the data storage unit 43, and the calculation circuit 140 may use only the linear regions of the waveform signal to output equally spaced displacements.

3. Embodiment 3

(1) Configuration of Displacement Measurement Device

Figure 10:
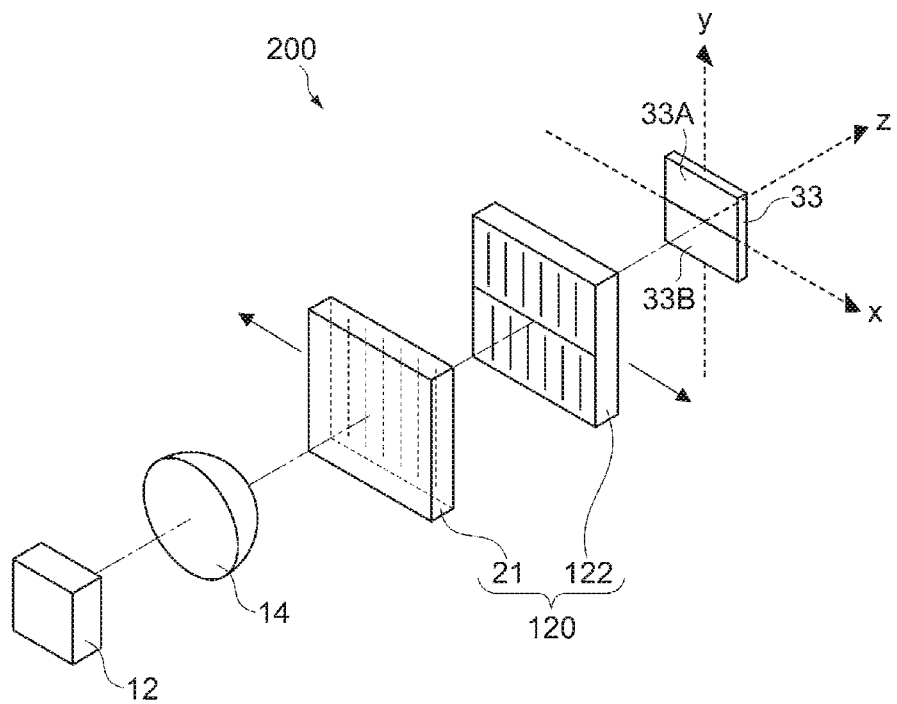
FIG. 10 is a perspective view schematically illustrating a configuration of a displacement measurement device according to Embodiment 3 of the present invention.
Figure 11:
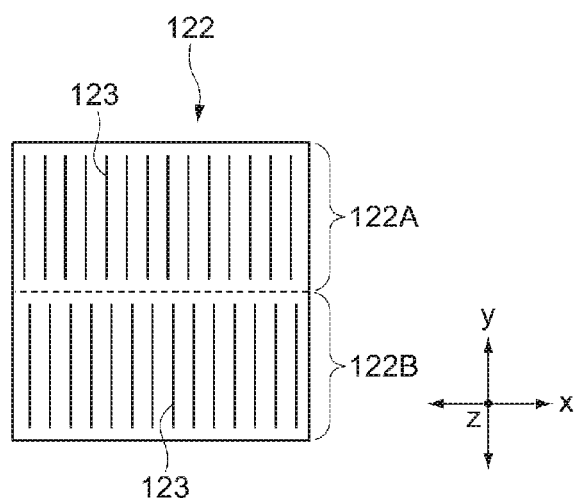
FIG. 11 illustrates a configuration of a second diffraction grating according to Embodiment 3.

FIG. 10 is a perspective view schematically illustrating a configuration of a displacement measurement device according to Embodiment 3 of the present invention. FIG. 11 illustrates a configuration of a second diffraction grating according to Embodiment 3.

The second diffraction grating 122 of the displacement measurement device 200 is divided in the Y direction into a plurality of regions that transmit light, such as into two regions 122A and 122B, for example. These two regions will be referred to as the "$y_1$ shift region" and the "$y_2$ shift region" for convenience.

As illustrated in FIG. 11, the $y_1$ shift region 122A and the $y_2$ shift region 122B each include grating lines of substantially equal pitches. However, the grating line pattern of the $y_1$ shift region 122A is shifted in the X direction relative to the grating line pattern of the $y_2$ shift region 122B by a prescribed distance that is less than ½ of the pitch of the grating lines 123. For example, the grating line patterns are formed shifted relative to one another by ¼ of the pitch.

An optical sensor PD 33 of the present embodiment is divided in the Y direction into a plurality of regions that correspond to the regions of the second diffraction grating 122, such as into two light-receiving regions 33A and 33B, for example. These light-receiving regions will be referred to as the "$y_1$ light-receiving region" and the "$y_2$ light-receiving region." In other words, of the interference light 27 (or 28; see FIG. 1) that exits from the second diffraction grating 122, the light that exits from the $y_1$ shift region 122A is incident on the $y_1$ light-receiving region 33A. Similarly, the light that exits from the $y_2$ shift region 122B is incident on the $y_2$ light-receiving region 33B.

As in Embodiment 1, a pair of diffraction gratings 120 can move relative to one another in the X direction. More specifically, the second diffraction grating 122 is movable and is fixed to the PD 33.

Figure 12:
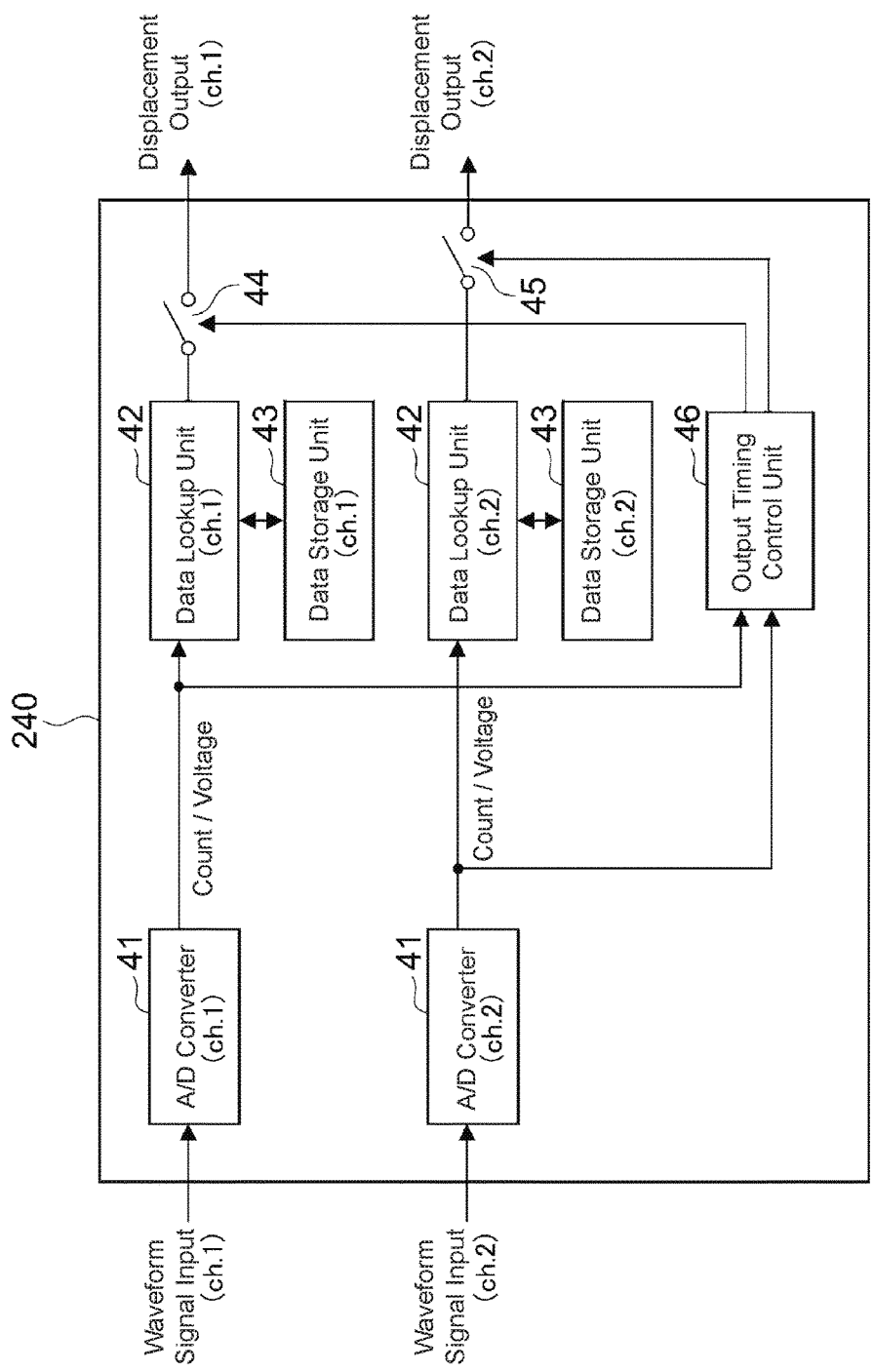
FIG. 12 is a block diagram illustrating a functional configuration of a calculation circuit according to Embodiment 3.

FIG. 12 is a block diagram illustrating the functional configuration of a calculation circuit according to the present embodiment. The calculation circuit 240 includes two input signal channels: channel 1 (ch. 1) into which the signal from the $y_1$ light-receiving region 33A of the PD 33 is input and channel 2 (ch. 2) into which the signal from the $y_2$ light-receiving region 33B is input.

The calculation circuit 240 includes an A/D converter 41, a data lookup unit 42, and a data storage unit 43 for each of the channels 1 and 2. Each of these blocks is functionally equivalent to the blocks in the calculation circuit 140 of Embodiment 2 as illustrated in FIG. 8.

The calculation circuit 240 also includes switches 44 and 45 that switch ON and OFF the output signals from the data lookup units 42 and an output timing controller 46 that controls the behavior of the switches 44 and 45. The output timing controller 46 gets the count values and voltages from the channels 1 and 2 and controls the switches 44 and 45 according to these values in order to output the displacement from one of the channels 1 and 2. In other words, the output timing controller 46 functions as a switching unit that selectively and alternately switches ON/OFF the switches 44 and 45 in order to switch the output displacement (that is, the displacement used for the calculation process).

(2) Method of Measuring Displacement

Figure 13:
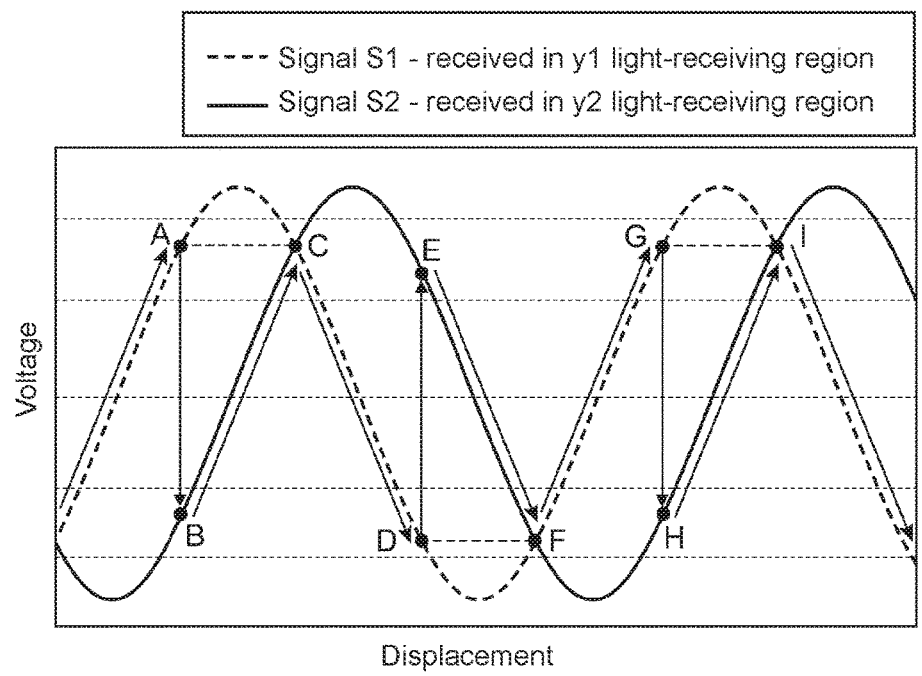
FIG. 13 is a graph showing signals from a $y_1$ light-receiving region and a $y_2$ light-receiving region of a PD.

FIG. 13 is a graph of the signals from the PD 33—that is, the signal from the $y_1$ light-receiving region 33A (a first waveform signal S1) and the signal from the $y_2$ light-receiving region 33B (a second waveform signal S2). The horizontal axis is displacement, and the vertical axis is the detected value (voltage), which represents the intensity of the light received. Because the grating line patterns of the $y_1$ shift region 122A and the $y_2$ shift region 122B are shifted relative to one another by ¼ of the grating line pitch, the phases of the signals S1 and S2 are also shifted by ¼ of the pitch.

For example, as illustrated in FIG. 13, when the second diffraction grating 122 is moved in a direction that increases the relative displacement between the pair of diffraction gratings 120, the output timing controller 46 switches between the output signals from channel 1 and channel 2 at the points A, B, C, D, E, and so on in that order. For example, from point B to point C, the output timing controller 46 uses and outputs the displacement according to the signal S2 (from channel 2). When the count value and detected value at point C are obtained, the output timing controller 46 switches to channel 1 and uses and outputs the displacement according to the signal S1. When the second diffraction grating 122 is moved in the opposite direction, the switching order is reversed and proceeds at the points I, H, G, and so on in that order.

The points C, F, I, and so on represent intersections between the signals S1 and S2. Points A and C represent the same detected voltage level. Similarly, points D and F represent the same detected voltage level, as do points G and I. Points B and A represent the same displacement. Similarly, points E and D represent the same displacement, as do points H and G.

The reason for using this switching process is as follows. The signals S1 and S2 are substantially the same as sine waves. Near the upper and lower peaks of these signals, the relationship between the displacement and the detected value is non-linear. As a result, the displacement detection sensitivity is reduced near these peaks, which may decrease the precision of the measurement. Therefore, the output timing controller 46 switches between the signals S1 and S2 before these peaks are reached (when a prescribed value less than the peak amplitude is detected), and whichever signal is switched on is used as the signal for the calculation process. In other words, using the linear regions of the signals S1 and S2 (in which the detection sensitivity is good) makes it possible to increase the measurement precision.

In order to determine when the intersection points C, F, I and so on occur, the calculation circuit may keep track of the difference between the signals S1 and S2 and use the timings when this difference becomes zero as the timings of the intersection points C, F, I, and so on, for example.

In the present embodiment, the grating line patterns are shifted relative to one another by ¼ of the grating line pitch. However, the grating line patterns may be shifted relative to one another by any amount less than ½ of the pitch, such as by ⅓ or ⅕ of the pitch.

In the present embodiment, the intersections between the signals S1 and S2 where the detected values are equal are used as the switching points A, C, D, F, and so on. However, points other than these intersections may also be used as the switching points.

In the present embodiment, a single optical sensor is divided into a plurality of light-receiving regions. However, a plurality of separate optical sensors may also be used to provide the plurality of light-receiving regions.

4. Embodiment 4

Figure 14:
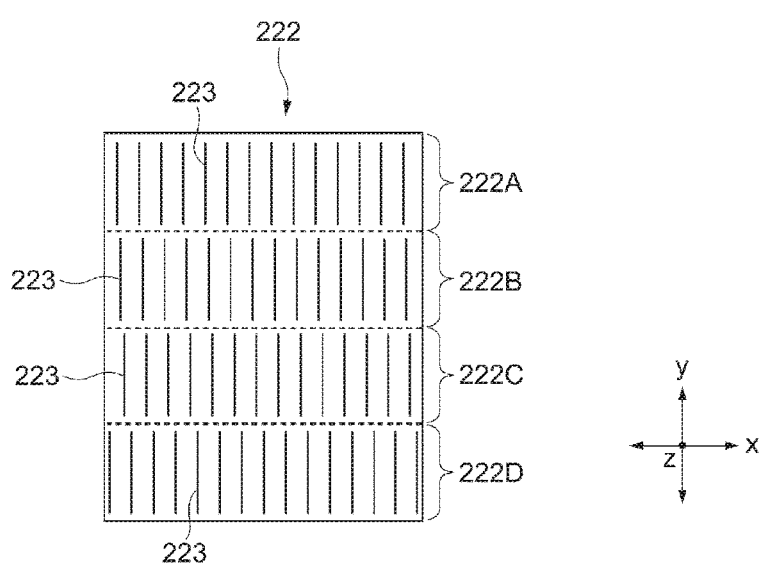
FIG. 14 illustrates a second diffraction grating of a pair of diffraction gratings of a displacement measurement device according to Embodiment 4 of the present invention as viewed from the Z direction.
Figure 15:
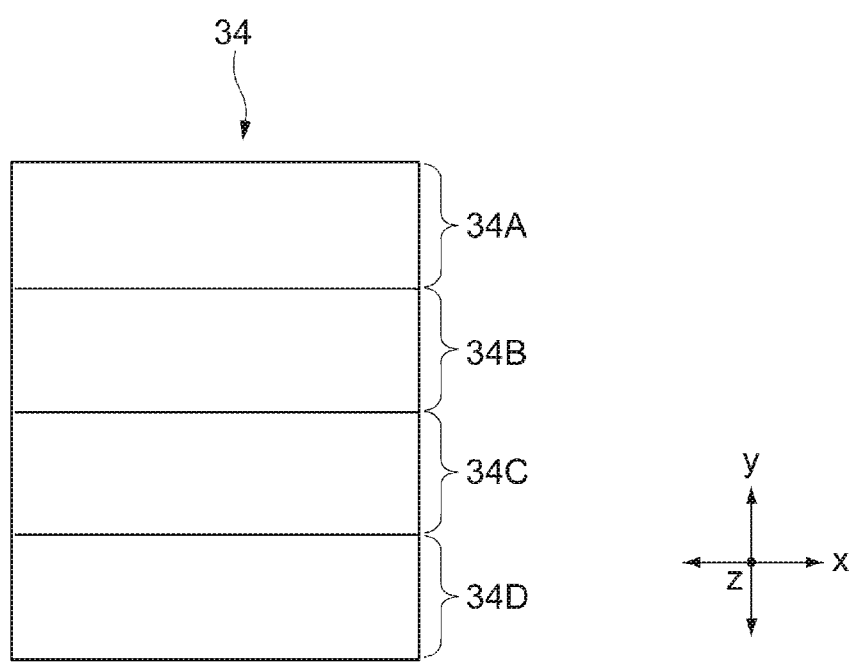
FIG. 15 illustrates light-receiving regions of a PD of a displacement measurement device as viewed from the Z direction.

FIG. 14 illustrates a second diffraction grating of a pair of diffraction gratings of a displacement measurement device according to Embodiment 4 of the present invention as viewed from the Z direction. FIG. 15 illustrates light-receiving regions of a PD of the displacement measurement device as viewed from the Z direction.

A second diffraction grating 222 of the pair of diffraction gratings of the displacement measurement device according to the present embodiment is divided in the Y direction into a plurality of shift regions—here, four shift regions 222A, 222B, 222C, and 222D, for example. The four shift regions each include grating lines 223 of substantially equal pitches.

The grating line patterns of three of the shift regions 222A, 222B, and 222C are each shifted in the X direction by ⅙ of the grating line pitch relative to the preceding grating line pattern, for example. Furthermore, the grating line pattern of the remaining shift region 222D is shifted in the X direction by ⅓ of the grating line pitch relative to the grating line patterns of the shift regions 222A and 222C. For convenience, in the following description, the shift region 222D will be referred to as the "reference shift region."

It should be noted that the arrangements of the shift regions 222A, 222B, 222C, and the reference shift region 222D of the second diffraction grating 222 are not limited to this example. For example, the reference shift region 222D may be arranged between two of the three other shift regions and the final remaining shift region.

As illustrated in FIG. 15, the light-receiving region of a PD 34 is divided in the Y direction into a plurality of light-receiving regions that correspond to the shift regions 222A to 222D of the second diffraction grating 222 configured as described above—here, into four light-receiving regions 34A to 34D, for example. Of the interference light 27 (or 28; see FIG. 1) to be detected, the light that exits from the shift regions 222A to 222D is detected by the light-receiving regions 34A to 34D of the PD 34, respectively. For convenience, in the following description, the light-receiving region 34D will be referred to as the "reference light-receiving region."

Figure 16:
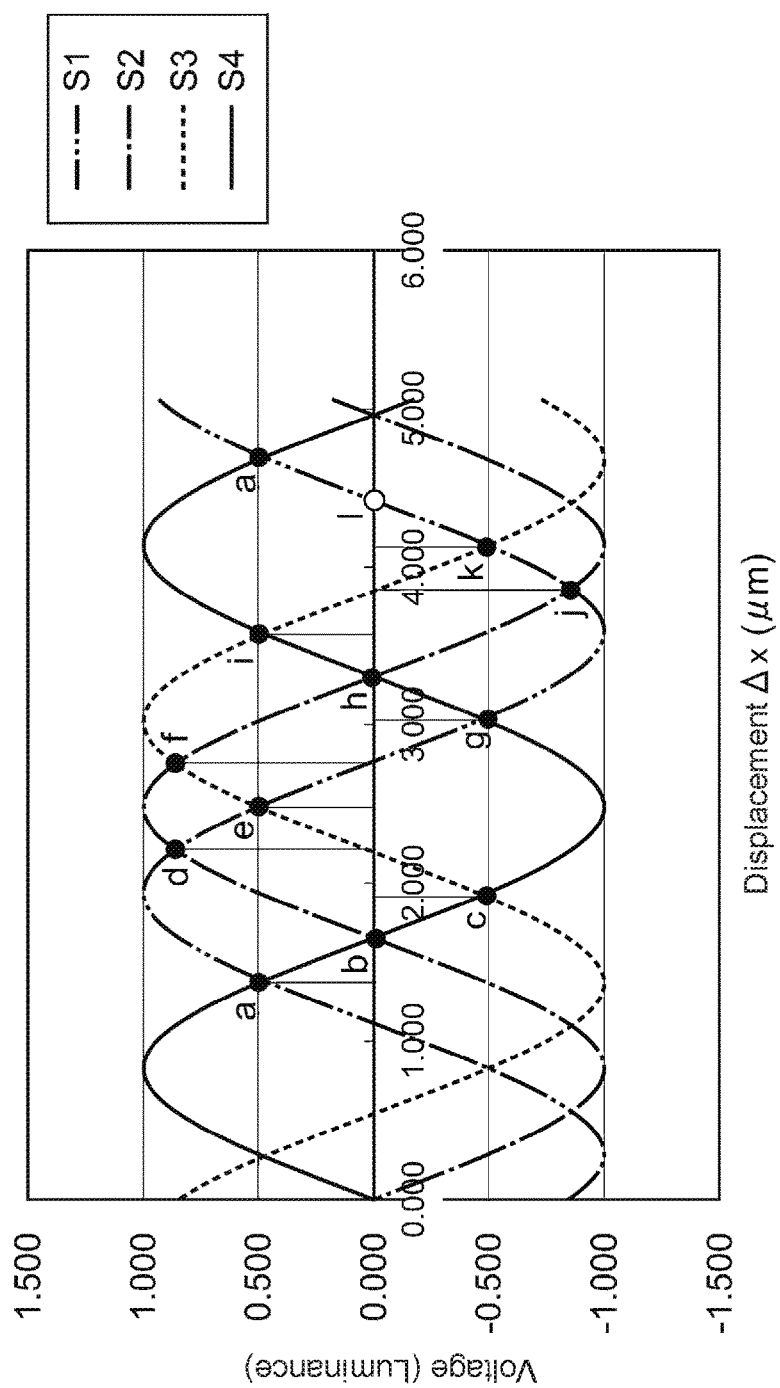
FIG. 16 is a graph of waveform signals from four light-receiving regions.

FIG. 16 is a graph of the resulting waveform signals from the four light-receiving regions. In FIG. 16, the phase of the waveform signal S4 from the reference light-receiving region 34D is shifted by 120° relative to the waveform signals S1 and S3 from the light-receiving regions 34A and 34C. The phases of the waveform signals S1 to S3 from the three light-receiving regions 34A to 34C are each shifted by 60° relative to the preceding waveform signal.

Figure 17:
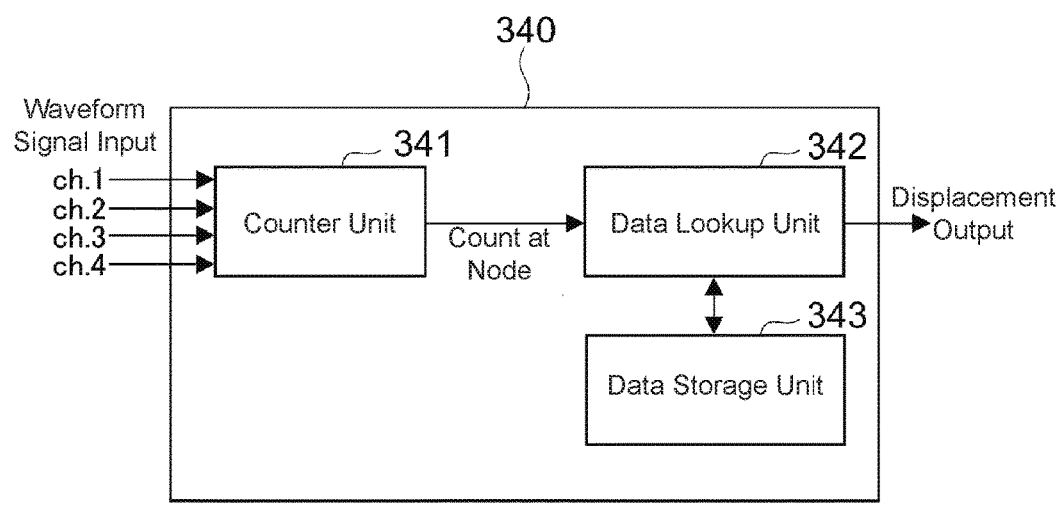
FIG. 17 is a block diagram illustrating a functional configuration of a calculation circuit for a displacement measurement device.

FIG. 17 is a block diagram illustrating the functional configuration of a calculation circuit for this displacement measurement device. The calculation circuit 340 includes a counting unit 341, a data lookup unit 342, and a data storage unit 343.

The waveform signals S1 to S4 are input to the counting unit 341 via channels 1 to 4. The counting unit 341 counts the intersections between these waveform signals S1 to S4, and the calculation circuit 340 calculates the displacement Δx on the basis of this counted value. More specifically, to determine the timing of an intersection a between the signals S4 and S1, for example, the counting unit 341 monitors for when the difference between the signals S4 and S1 becomes equal to 0 (or less than or equal to a threshold value close to 0). In this way, the counting unit 341 counts the intersections a, b, c, . . . , and k between the signals S1 to S4.

The counting unit 341 may include an A/D converter and perform this process digitally, or the counting unit 341 may count the intersections using an analog process without using an A/D converter.

The data storage unit 343 stores data that defines the correspondence between the counted values and the associated displacements. The data lookup unit 342 extracts the displacement corresponding to the number of intersections counted by the counting unit 341 from the data storage unit 343 and outputs this displacement Δx.

As illustrated in FIG. 16, the white point I is not an intersection between the waveform signals but rather a point that represents the next time the signal S1 takes a value of 0 after the point k. The counting unit 341 counts this point I as an exception, and the data lookup unit 342 is capable of outputting a displacement that corresponds to this point I. In this way, the calculation circuit 340 can output uniformly spaced displacements.

A displacement equal to the full wavelength of the signals S1 to S4 is also equal to the grating line pitch, and therefore the calculation circuit 340 can calculate and output displacements in units sufficiently smaller than the grating line pitch. In other words, the calculation circuit 340 can measure displacements with high precision.

In the present embodiment, the four signals S1 to S4 are obtained from the four light-receiving regions 34A to 34D that correspond to the four shift regions 222A to 222D. However, the second diffraction grating may include only three shift regions, and the PD may include only three light-receiving regions corresponding to those shift regions. In this case, the grating line pattern of each of the three shift regions should be shifted in the X direction by ⅓ of the grating line pitch relative to the other shift regions. Moreover, the three light-receiving regions of the PD will output three waveform signals shifted in phase by 120° relative to one another. The calculation circuit can then get these three waveform signals, count the intersections therebetween, and calculate the displacement on the basis of this counted value.

5. Embodiment 5

Figure 18:
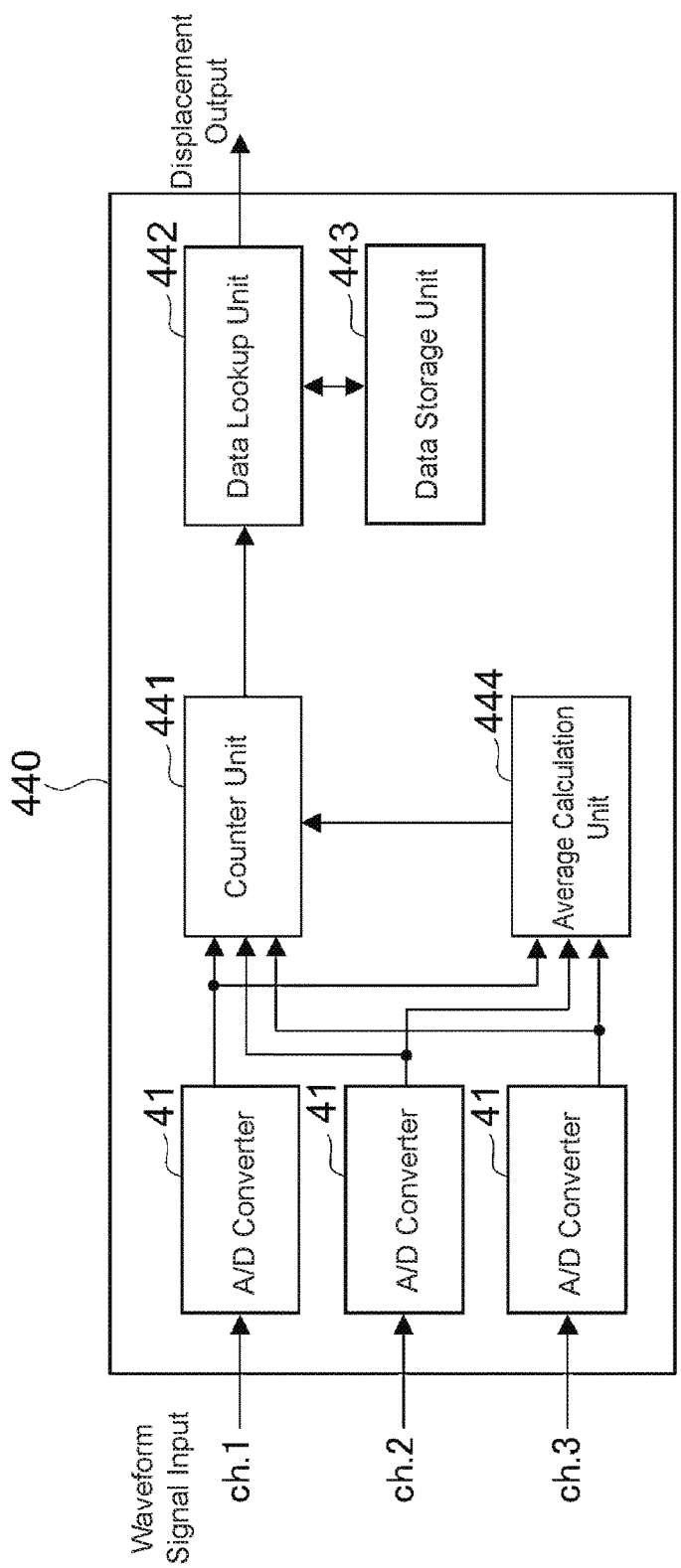
FIG. 18 is a block diagram illustrating a functional configuration of a calculation circuit of a displacement measurement device according to Embodiment 5 of the present invention.

FIG. 18 is a block diagram illustrating the functional configuration of a calculation circuit of a displacement measurement device according to Embodiment 5 of the present invention. The displacement measurement device according to Embodiment 5 includes a second diffraction grating that has three shift regions and a PD that has three light-receiving regions corresponding to those shift regions (these components are not illustrated in the figure).

A calculation circuit 440 includes three A/D converters 41, a counting unit 441, an average value calculation unit 444, a data lookup unit 442, and a data storage unit 443.

The waveform signals from the three light-receiving regions of the PD are input via channels 1 to 3 to the three A/D converters 41, which output the waveform signals as digital values.

The average value calculation unit 444 calculates the current average value of the values from the A/D converters 41 (that is, the current average value of the three waveform signals). The counting unit 441 counts and outputs the number of intersections between the waveform signals formed by the values from the A/D converters 41 and the average value. The data storage unit 443 stores data that defines the correspondence between the counted values and the associated displacements.

FIGS. 19A to 19D are simulations of the three waveform signals from the light-receiving regions of the PD for the case described above in section 1.(4), in which the PD detects interference light 28 that also contains zero-order light 30. Each graph corresponds to a different intensity of zero-order light 30 contained in the interference light 28. The graphs also show the average values of the three waveform signals. The intensities (amounts) of the zero-order light 30 contained in the interference light 28 are 0%, 2%, 4%, and 6% for FIGS. 19A to 19D, respectively.

In the simulations, the amplitudes of the waveform signals from the PD tend to decrease as the amount of the zero-order light 30 increases and as the displacement is nearer to the center of the displacement range in the X direction.

The data lookup unit 442 extracts the displacement corresponding to the number of intersections a, b, c, and so on (see FIGS. 19B to 19D) counted by the counting unit 441 from the data storage unit 443 and outputs this displacement value.

In the present embodiment, keeping track of the average value (which forms a line that represents the noise due to the zero-order light) makes it possible to count the intersections between the waveform signals and that average value level, which occur at precise intervals in the displacement direction even when zero-order light is contained in the interference light 28. Therefore, the calculation circuit 440 can calculate accurate displacements using the counted number of intersections.

As described above in section 1.(4), setting the distance between the diffraction gratings such that the optical path differences between the types of light contained in the interference light 28 satisfy the formula $(2m+1)\lambda/4$ makes it possible to reduce the noise due to the zero-order light. However, the present embodiment is particularly effective in cases in which the amount of zero-order light remains at several percent even when the distance between the diffraction gratings is set as described above, for example.

Furthermore, even using just the circuit-based counting process of the present embodiment makes it possible to reduce the effects of noise due to zero-order light in cases in which the distance between the diffraction gratings is not set on the basis of the optical path differences.

The displacement measurement device according to the present embodiment forms three waveform signals. However, the displacement measurement device may also form two or four or more waveform signals like in the embodiments described above, count the intersections between these waveform signals and the average value, and calculate displacements on the basis of those counted values.

6. Holder for Displacement Measurement Device

Figure 20:
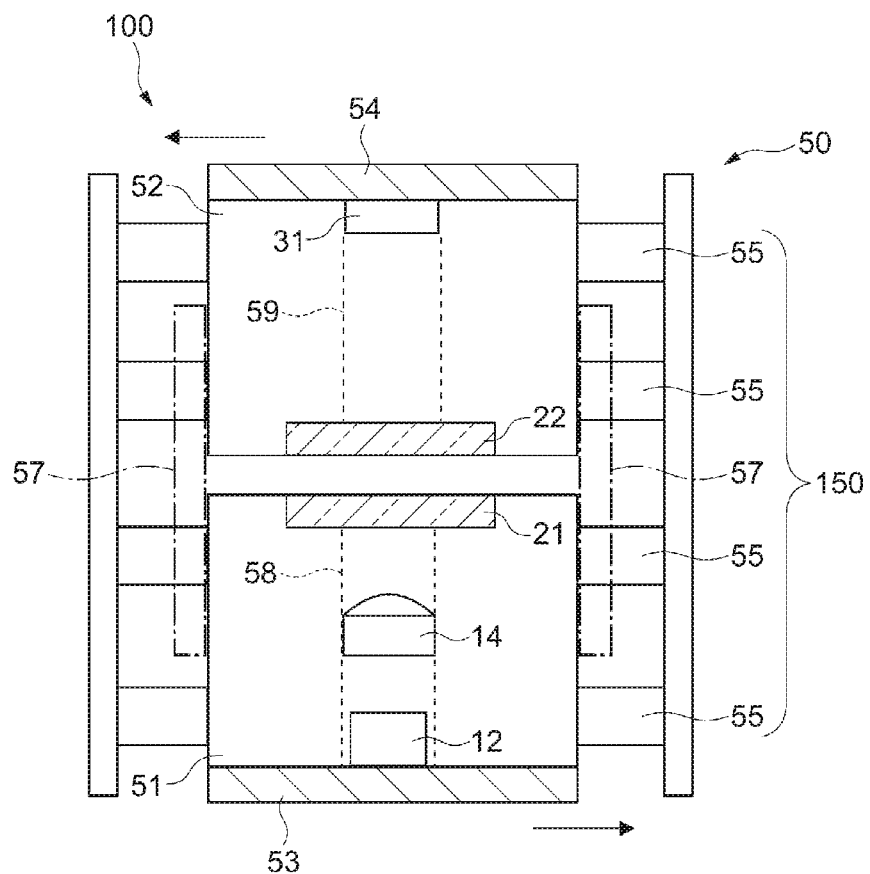
FIG. 20 illustrates an embodiment of a displacement measurement device that includes a support mechanism for supporting the optical system illustrated in FIG. 1, for example.

FIG. 20 illustrates an embodiment of the displacement measurement device 100 (or 200) that includes a support mechanism for supporting the optical system illustrated in FIG. 1, for example.

The support mechanism 50 includes a first holder 51 and a second holder 52, which are both box-shaped. The first holder 51 supports the light source 12, the collimator lens 14, and the first diffraction grating 21 as a single unit. The second holder 52 supports the second diffraction grating 22 and the PD 31 as a single unit.

A mounting substrate 53 on which the light source 12 is mounted is fixed to one end of the first holder 51. The first diffraction grating 21 is fixed to the other end of the first holder 51. The second diffraction grating 22 is fixed to one end of the second holder 52, and a mounting substrate 54 on which the PD 31 is mounted is fixed to the other end of the second holder 52.

A path 58 is formed in the first holder 51 to allow light emitted from the light source 12 to travel through the collimator lens 14 to the first diffraction grating 21. A path 59 is formed in the second holder 52 to allow the interference light 27 (see FIG. 1) that exits from the second diffraction grating 22 to travel mainly to the PD 31.

The support mechanism 50 includes another support mechanism 150 that supports the first holder 51 and the second holder 52 and allows the holders to slide in the X direction. The support mechanism 150 functions as a connecting member that connects together the holders 51 and 52 and allows the holders to move relative to one another.

The support mechanism 150 includes slide shafts 55 that extend in the X direction. X direction through holes (not illustrated in the figure) are formed through the bottom portions of the first holder 51 and the second holder 52 (the bottom portions in the Y direction in the figure), and the slide shafts 55 are inserted through these through holes, for example. Two slide shafts 55 are provided for each holder, for example.

The support mechanism 150 also includes elastic members 57 that elastically connect the first holder 51 and the second holder 52 to one another. The elastic members 57 are arranged on both side faces of the first holder 51 and the second holder 52 in order to connect together those side faces, for example. The elastic members 57 are made from a material such as a resin or a metal and have an elastically deformable structure and shape.

When using the displacement measurement device 100 to measure an object, the object to be measured is fixed to the displacement measurement device 100, with a first portion of the object (not illustrated in the figure) attached to the first holder 51 and a second portion of the object (also not illustrated in the figure) attached to the second holder 52. This makes it possible to measure displacement of the first and second portions of the object in the X direction.

7. Other Embodiments

The present invention is not limited to the embodiments described above and can be implemented in the form of various other embodiments.

In the embodiments described above, the calculation circuit typically references a lookup table that defines the correspondence between counted values (and voltage levels)

and the associated displacements and outputs the appropriate displacement value. However, the calculation circuit may calculate and output the displacement using a prescribed formula. For example, the calculation circuit may store a prescribed unit displacement and multiply the final counted value by the unit displacement, or the calculation circuit may add a unit displacement each time the counted value is incremented. If the count were to be incremented by 1 for each full wavelength of the waveform signal, for example, the unit displacement would be equal to the grating line pitch. If the count were to be incremented by 1 for each half-wavelength of the waveform signal, the unit displacement would be equal to half of the grating line pitch.

In the embodiments illustrated in FIGS. 11 and 14, the shift regions are formed in the second diffraction grating. However, the shift regions may be formed in the first diffraction grating instead.

The second diffraction gratings 122 and 222 illustrated in FIGS. 11 and 14 have a plurality of shift regions arranged in the Y direction. However, the plurality of shift regions may also be arranged in the X direction. In this case, the plurality of light-receiving regions of the optical sensor should also be arranged in the X direction. Also, in this case the grating line patterns of the shift regions should be shifted relative to one another in the Y direction by a prescribed distance that is less than ½ of the grating line pitch, and the light-receiving regions should be arranged appropriately corresponding to those grating line patterns.

Additional alternative embodiments that combine at least two of the characteristic features of the embodiments described above can also be implemented. For example, rather than using the switching scheme, the displacement measurement device illustrated in FIGS. 10 to 12 may use the counting process described in Embodiments 4 and 5 and calculate displacements according to the number of signal intersections counted.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A displacement measurement device, comprising:
a light source;
a first diffraction grating and a second diffraction grating that are arranged along a progression path of light from the light source and that are movable relative to one another, the first diffraction grating and the second diffraction grating generating diffracted light;
an optical sensor that detects interference light produced by interference between −nth order diffracted light generated as a result of the second diffraction grating diffracting +nth order diffracted light from the first diffraction grating and +nth order diffracted light generated as a result of the second diffraction grating diffracting −nth order diffracted light from the first diffraction grating, where n is a natural number greater than or equal to 1; and
a calculation unit that calculates, in accordance with a signal from the optical sensor, a relative displacement between the first diffraction grating and the second diffraction grating in a direction orthogonal to an optical axis of the first diffraction grating and the second diffraction grating,
wherein the first diffraction grating and the second diffraction grating each have a plurality of grating lines, and
wherein said direction in which said relative displacement is calculated is a direction in which the plurality of grating lines are arranged,
wherein one of the first diffraction grating and the second diffraction grating is divided into a plurality of shift regions,
wherein the plurality of shift regions have grating line patterns shifted relative to one another in the direction in which the plurality of grating lines are arranged by a prescribed distance that is less than ½ of a grating line pitch,
wherein the optical sensor has a plurality of light-receiving regions that receive light from the plurality of shift regions, and
wherein the calculation unit selectively switches between signals from the plurality of light-receiving regions at prescribed times and applies one signal that has been selected to a calculation process.

2. The displacement measurement device according to claim 1,
wherein the optical sensor receives zero-order light that travels directly along the optical axis of the first diffraction grating and the second diffraction grating to detect interference light between the zero-order light and the ±nth order diffracted light from the second diffraction grating, and
wherein a distance between the first diffraction grating and the second diffraction grating is set such that an optical path difference between the ±nth order diffracted light and the zero-order light satisfies $(2m+1)\lambda/4$, where m is an integer greater than or equal to 0.

3. The displacement measurement device according to claim 1,
wherein the calculation unit includes:
a detected value output unit that outputs detected values of periodic waveform signals from the plurality of light-receiving regions that have periods corresponding to the grating line pitch, and
a switching unit that switches from a first waveform signal of the waveform signals that is used for the calculation process to a second waveform signal to be used for the calculation process at a timing in which a prescribed detected value that is less than a peak amplitude of the first waveform signal is detected.

4. The displacement measurement device according to claim 3, wherein the calculation unit uses detected values at intersections between the first waveform signal and the second waveform signal or detected values at same levels as the detected values at the intersections as the prescribed detected value.

5. The displacement measurement device according to claim 1,
wherein the calculation unit includes a counting unit that counts intersections between periodic waveform signals from the plurality of light-receiving regions that have periods corresponding to the grating line pitch, and
wherein the calculation unit calculates the displacement using a counted value from the counting unit.

6. The displacement measurement device according to claim 1,
wherein the calculation unit includes a counting unit that counts intersections of periodic waveform signals from the plurality of light-receiving regions that have periods corresponding to the grating line pitch with an average value of those waveform signals, and
wherein the calculation unit calculates the displacement using a counted value from the counting unit.

7. The displacement measurement device according to claim 1, further comprising:
a first holder that supports the light source and the first diffraction grating;
a second holder that supports the second diffraction grating and the optical sensor; and
a connecting member that connects together the first holder and the second holder such that the first holder and the second holder are movable relative to one another in the direction orthogonal to the optical axis.

8. A displacement measurement device, comprising:
a light source;
a first diffraction grating and a second diffraction grating that are arranged along a progression path of light from the light source and that are movable relative to one another, the first diffraction grating and the second diffraction grating generating diffracted light;
an optical sensor that detects interference light produced by interference between −nth order diffracted light generated as a result of the second diffraction grating diffracting +nth order diffracted light from the first diffraction grating and +nth order diffracted light generated as a result of the second diffraction grating diffracting −nth order diffracted light from the first diffraction grating, where n is a natural number greater than or equal to 1; and
a calculation unit that calculates, in accordance with a signal from the optical sensor, a relative displacement between the first diffraction grating and the second diffraction grating in a direction orthogonal to an optical axis of the first diffraction grating and the second diffraction grating,
wherein the first diffraction grating and the second diffraction grating each have a plurality of grating lines, and
wherein said direction in which said relative displacement is calculated is a direction in which the plurality of grating lines are arranged,
wherein one of the first diffraction grating and the second diffraction grating is divided into a plurality of shift regions,
wherein the plurality of shift regions have grating line patterns shifted relative to one another in the direction in which the plurality of grating lines are arranged by a prescribed distance that is less than ½ of a grating line pitch,
wherein the optical sensor has a plurality of light-receiving regions that receive light from the plurality of shift regions,
wherein the calculation unit includes a counting unit that counts intersections between periodic waveform signals from the plurality of light-receiving regions that have periods corresponding to the grating line pitch, and
wherein the calculation unit calculates the displacement using a counted value from the counting unit.

9. A displacement measurement device, comprising:
a light source;
a first diffraction grating and a second diffraction grating that are arranged along a progression path of light from the light source and that are movable relative to one another, the first diffraction grating and the second diffraction grating generating diffracted light;
an optical sensor that detects interference light produced by interference between −nth order diffracted light generated as a result of the second diffraction grating diffracting +nth order diffracted light from the first diffraction grating and +nth order diffracted light generated as a result of the second diffraction grating diffracting −nth order diffracted light from the first diffraction grating, where n is a natural number greater than or equal to 1; and
a calculation unit that calculates, in accordance with a signal from the optical sensor, a relative displacement between the first diffraction grating and the second diffraction grating in a direction orthogonal to an optical axis of the first diffraction grating and the second diffraction grating,
wherein the first diffraction grating and the second diffraction grating each have a plurality of grating lines, and
wherein said direction in which said relative displacement is calculated is a direction in which the plurality of grating lines are arranged,
wherein one of the first diffraction grating and the second diffraction grating is divided into a plurality of shift regions,
wherein the plurality of shift regions have grating line patterns shifted relative to one another in the direction in which the plurality of grating lines are arranged by a prescribed distance that is less than ½ of a grating line pitch,
wherein the optical sensor has a plurality of light-receiving regions that receive light from the plurality of shift regions,
wherein the calculation unit includes a counting unit that counts intersections of periodic waveform signals from the plurality of light-receiving regions that have periods corresponding to the grating line pitch with an average value of those waveform signals, and
wherein the calculation unit calculates the displacement using a counted value from the counting unit.

* * * * *